(12) United States Patent
Anania et al.

(10) Patent No.: US 12,419,228 B2
(45) Date of Patent: Sep. 23, 2025

(54) DEFLECTOR ASSEMBLY FOR OUTDOOR POWER EQUIPMENT

(71) Applicant: Briggs & Stratton, LLC, Wauwatosa, WI (US)

(72) Inventors: Michael J. Anania, Westernville, NY (US); Ray D. Perry, Hamilton, NY (US); James F. Marshall, Munnsville, NY (US); Jonathan Olson, Kansas City, MO (US); Sandeep R. Pawar, Rome, NY (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 902 days.

(21) Appl. No.: 17/550,854

(22) Filed: Dec. 14, 2021

(65) Prior Publication Data

US 2022/0186745 A1    Jun. 16, 2022

Related U.S. Application Data

(60) Provisional application No. 63/125,588, filed on Dec. 15, 2020.

(51) Int. Cl.
*A01G 20/47* (2018.01)
*B05B 1/00* (2006.01)
(Continued)

(52) U.S. Cl.
CPC .............. *A01G 20/47* (2018.02); *B05B 1/002* (2018.08); *B05B 1/005* (2013.01); *B05B 1/3073* (2013.01);
(Continued)

(58) Field of Classification Search
CPC ........ A01G 20/47; B05B 1/002; B05B 1/005; B05B 1/3073; B08B 5/02; B62D 57/001;
(Continued)

(56) References Cited

U.S. PATENT DOCUMENTS

| | | | | |
|---|---|---|---|---|
| 3,075,813 A * | 1/1963 | Vohl | ........................ | E01H 5/045 |
| | | | | 406/165 |
| 6,499,238 B2 * | 12/2002 | Kluck | ..................... | E01H 5/045 |
| | | | | 37/261 |

(Continued)

OTHER PUBLICATIONS

US 9,487,193, 11/2016, Hurricane, Inc. (withdrawn).

*Primary Examiner* — Joseph M Rocca
*Assistant Examiner* — Robert E Pezzuto
(74) *Attorney, Agent, or Firm* — Foley & Lardner LLP

(57) ABSTRACT

Outdoor power equipment includes a chassis, a blower housing, a discharge housing, and a deflector assembly. The blower housing is supported by the chassis. The discharge housing is coupled to the blower housing and is defined by a first discharge chute and a second discharge chute that extend in opposite directions. An impeller is received within the blower housing and is configured to rotate within the blower housing to direct air from the blower housing toward the discharge housing. The deflector assembly is supported by the chassis and includes an actuator and a deflector. The deflector is movable within the discharge housing in response to movement by the actuator to selectively direct flow from the blower housing through the first and second discharge chutes.

16 Claims, 15 Drawing Sheets

(51) Int. Cl.
*B05B 1/30* (2006.01)
*B08B 5/02* (2006.01)
*B62D 51/00* (2006.01)
*B62D 51/02* (2006.01)
*B62D 51/04* (2006.01)
*E01H 1/08* (2006.01)
*F04D 29/46* (2006.01)

(52) U.S. Cl.
CPC .............. *B08B 5/02* (2013.01); *B62D 51/001* (2013.01); *B62D 51/02* (2013.01); *B62D 51/04* (2013.01); *E01H 1/0809* (2013.01); *F04D 29/464* (2013.01)

(58) Field of Classification Search
CPC ...... B62D 57/02; B62D 57/04; B62D 51/001; B62D 51/02; B62D 51/04; E01H 1/0809; F04D 29/464; A01D 34/711; A01D 34/66; A01D 69/002
See application file for complete search history.

(56) References Cited

U.S. PATENT DOCUMENTS

| | | | |
|---|---|---|---|
| 8,387,205 | B2 | 3/2013 | Weihl et al. |
| 9,650,024 | B2 | 5/2017 | Weihl |
| 10,327,606 | B2 * | 6/2019 | Restall .................. A01G 20/43 |
| 11,178,814 | B2 | 11/2021 | Weihl |
| 2010/0257694 | A1 | 10/2010 | Weihl et al. |
| 2016/0150922 | A1 * | 6/2016 | Restall .................. A01G 20/47 29/428 |
| 2016/0251003 | A1 | 9/2016 | Weihl |
| 2018/0249629 | A1 | 9/2018 | Weihl |
| 2019/0380272 | A1 | 12/2019 | Weihl |
| 2021/0127577 | A1 | 5/2021 | Weihl |
| 2021/0298224 | A1 | 9/2021 | Weihl |

\* cited by examiner

DEFLECTOR ASSEMBLY FOR OUTDOOR POWER EQUIPMENT

CROSS-REFERENCE TO RELATED APPLICATION

This application claims priority to U.S. Provisional Patent Application No. 63/125,588, filed Dec. 15, 2020, the content of which is hereby incorporated by reference in its entirety.

BACKGROUND

The present invention relates generally to the field of blowers, and more particularly to the field of stand-on or ride-on blowers having direction-adjustable airflow.

SUMMARY

One exemplary embodiment relates to a ride-on blower. The ride-on blower includes a chassis, a blower housing, a discharge housing, an impeller, and a deflector assembly. The blower housing is supported by the chassis. The discharge housing is coupled to the blower housing. The discharge housing is defined by a first discharge chute and a second discharge chute. The first discharge chute and the second discharge chute extend in opposite directions. The impeller is received within the blower housing and is configured to rotate within the blower housing to direct air from the blower housing through the discharge housing. The deflector assembly is supported by the chassis, and includes an actuator and a deflector. The deflector is movable within the discharge housing in response to movement by the actuator. Movement of the actuator to a first position rotates the deflector to a position directing air flow generated by the impeller through the first discharge chute. Moving the actuator to a second position rotates the deflector to a position directing air flow generated by the impeller through the second discharge chute.

Another exemplary embodiment relates to a stand-on blower. The stand-on blower includes a chassis, a prime mover, a blower housing, a discharge housing, and a deflector assembly. The prime mover is supported by the chassis and is operably coupled to an impeller. The prime mover is configured to rotate the impeller. The blower housing receives the impeller. The blower housing defines an air inlet to pull external air into the blower housing to the impeller. The discharge housing is coupled to the blower housing. The discharge housing includes a first discharge chute having a first chute exit and a second discharge chute having a second chute exit. The first chute exit is positioned to discharge air flow generated by the impeller to a first side of the chassis and the second chute exit is positioned to discharge air flow generated by the impeller to a second side of the chassis. The deflector assembly includes an actuator and a deflector. The actuator is movable among at least two positions. The deflector is mechanically coupled to the actuator through a geared connection such that the movement of the actuator rotates the deflector within the discharge housing. Rotation of the actuator in a first direction to a first stop rotates the deflector to a first position directing air flow generated by the impeller through the first discharge chute and blocking air flow generated by the impeller through the second discharge chute. Rotation of the actuator in a second direction opposite the first direction to a second stop rotates the deflector to a second position directing air flow generated by the impeller through the second discharge chute and blocking air flow generated by the impeller through the first discharge chute.

Another exemplary embodiment relates to a deflector assembly for controlling forced airflow through a discharge housing. The deflector assembly includes an actuator, an actuator shaft, a first gear, a second gear, a deflector shaft, and a deflector. The actuator is manually movable in at least a first direction and a second direction opposite the first direction. The actuator shaft is coupled to the actuator on a proximate end, and is movable in response to movement by the actuator. The first gear is rigidly coupled to a distal end of the actuator shaft opposite the proximate end. The first gear rotates in response to movement by the actuator shaft. The second gear is meshed with the first gear such that rotation of the first gear in the first direction rotates the second gear in the second direction. The deflector shaft is rigidly coupled to the second gear so that rotation of the second gear rotates the deflector shaft. The deflector is coupled to the deflector shaft and is configured to rotate with the deflector shaft. The deflector is movable over a first sweep range of between 130 degrees and 160 degrees in response to movement of the actuator over a second sweep range of between 50 degrees and 70 degrees.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a deflector assembly for outdoor power equipment is depicted. The deflector assembly is incorporated into a stand-on blower, for example, to generate and control multi-directional airflow through the blower. The deflector assembly includes a deflector that is positioned downstream of an impeller/fan assembly of the blower. The deflector assembly controls the position of the deflector so that the blower can direct leaves and other debris in multiple discrete and controllable directions, which can allow for more efficient and effective blower use.

The deflector of the deflector assembly is adapted to be moved between different positions using a pedal or actuator that can be readily adjusted during blower use. The pedal or actuator is arranged to move the deflector of the deflector assembly between two or more discrete positions that adjusts the path of the airflow generated by an impeller/fan of the blower. For example, the deflector can be moved between a first position where air is discharged to a first lateral side (e.g., the right side) of the blower, a second position where air is discharged to a second lateral side (e.g., the left side) of the blower, and a third position where air is blocked from exiting either of the first lateral side or the second lateral side. Directions are provided relative to normal operation of the ride-blower with the operator standing on the operator platform and facing forward toward the control panel for controlling operation of the ride-on blower. The deflector assembly can include discrete clocking positions that lock or bias the deflector into each of the three positions until further actuation of the pedal or actuator occurs. In some examples, the pedal is positioned upon a platform of the blower so that a user can adjust a position of the deflector assembly with his or her foot, so that neither hand needs to be taken off of the steering controls of the blower, which might otherwise impact the steering of the blower.

Figure 1:
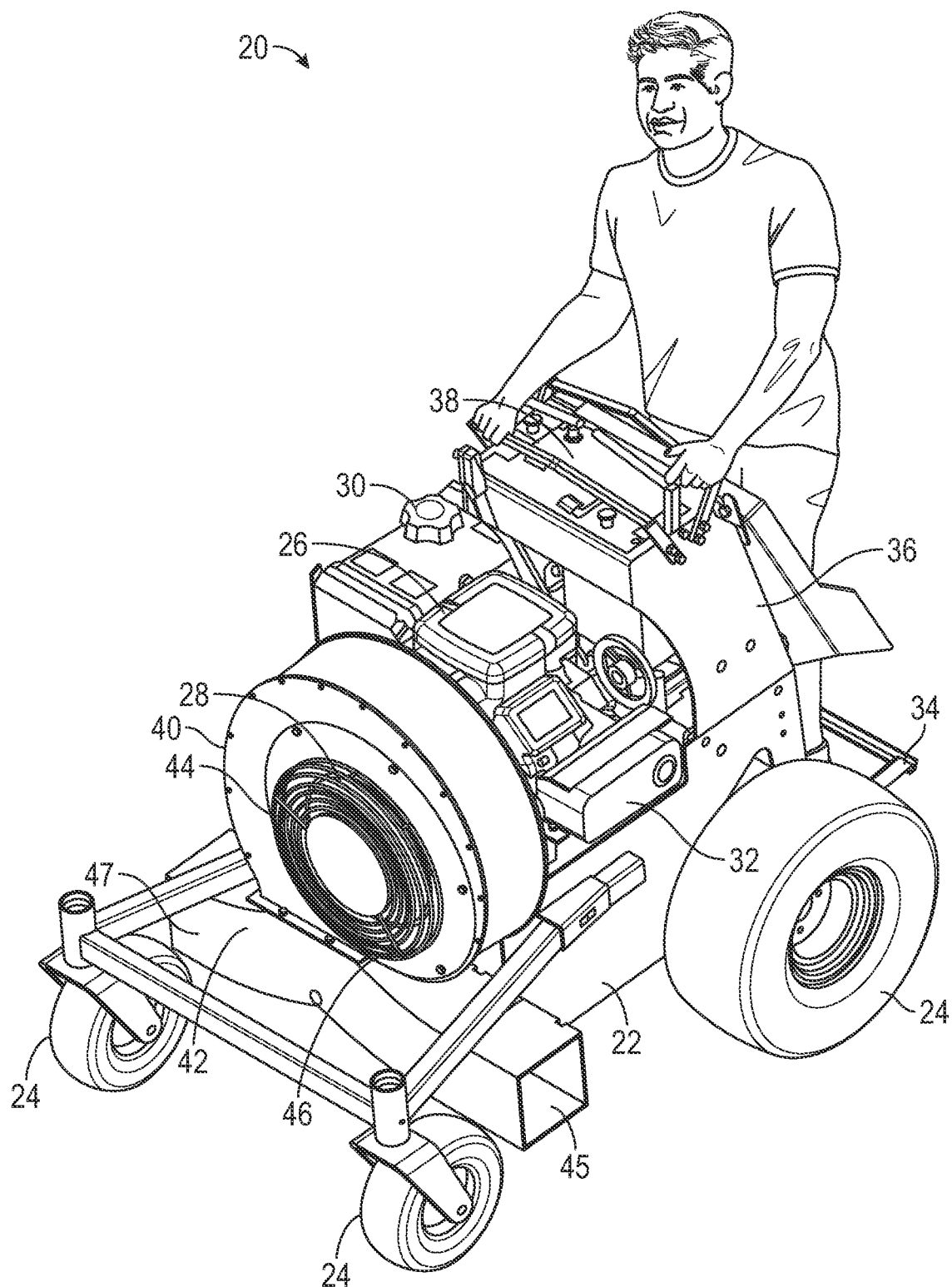
FIG. 1 is a front perspective view of a blower, according to an exemplary embodiment.
Figure 2:
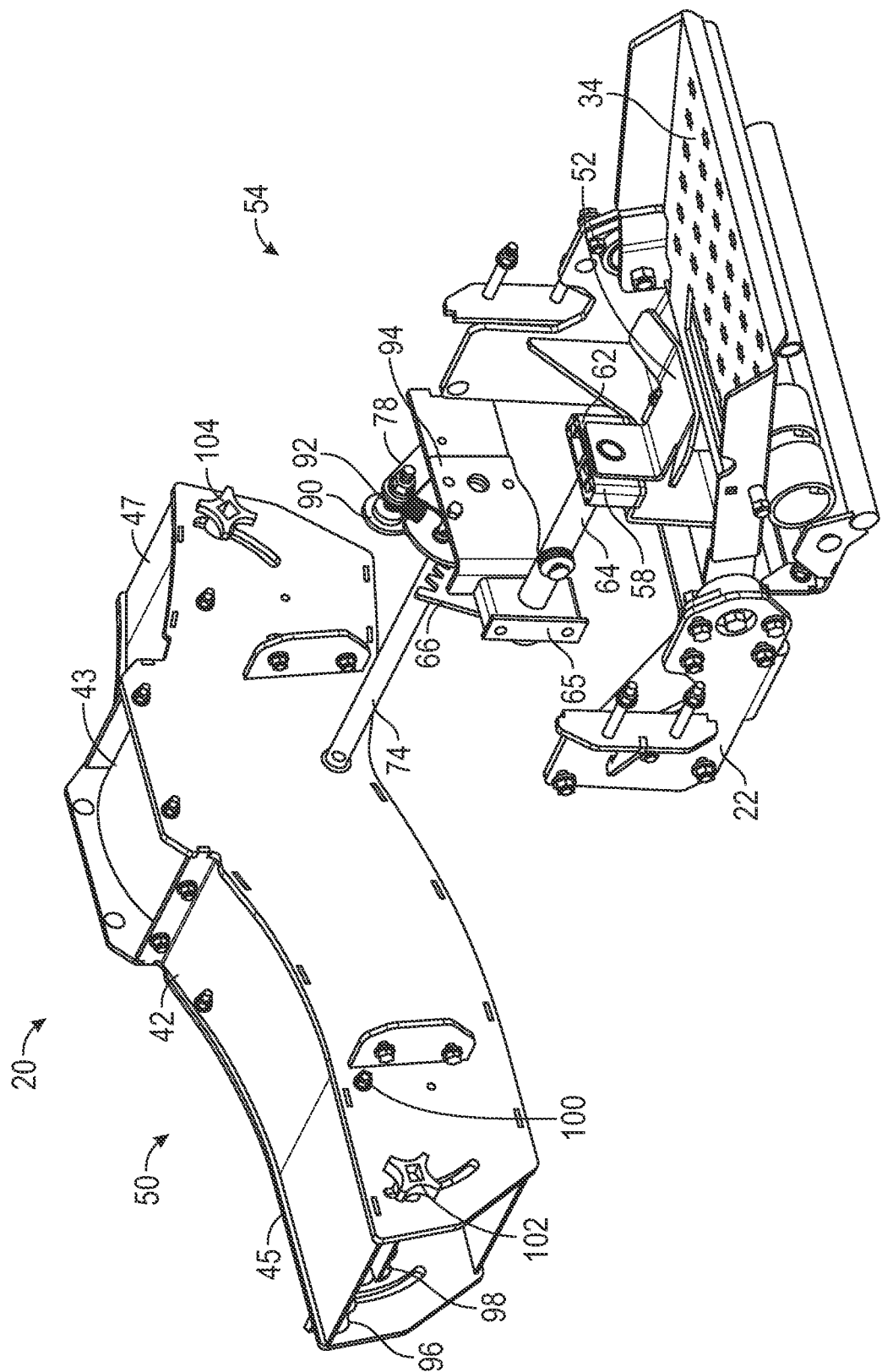
FIG. 2 is a rear perspective view of the blower of FIG. 1 with a blower housing and control housing removed.
Figure 3:
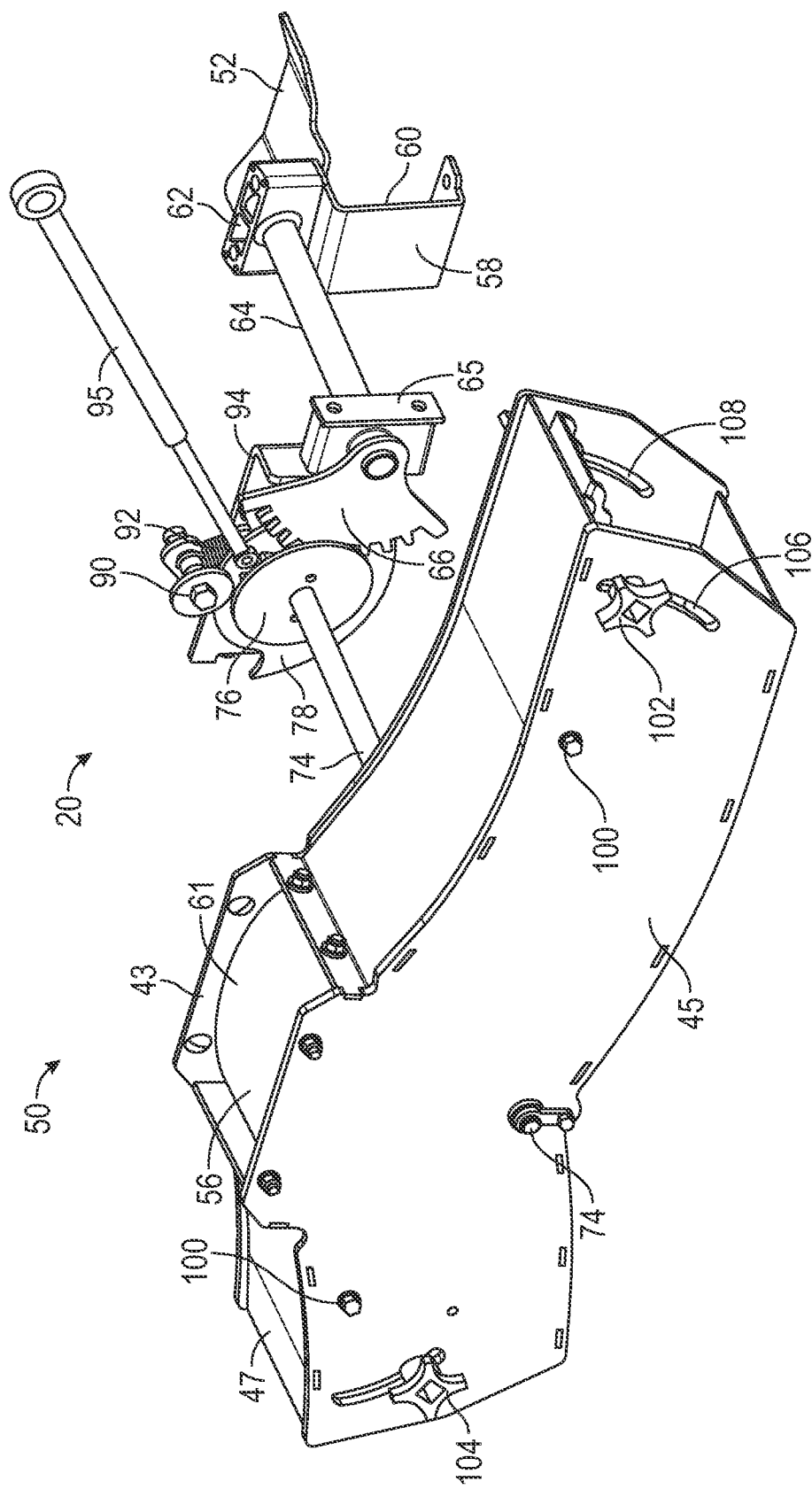
FIG. 3 is a front perspective view of a deflector assembly incorporated into the blower of FIG. 1.
Figure 4:
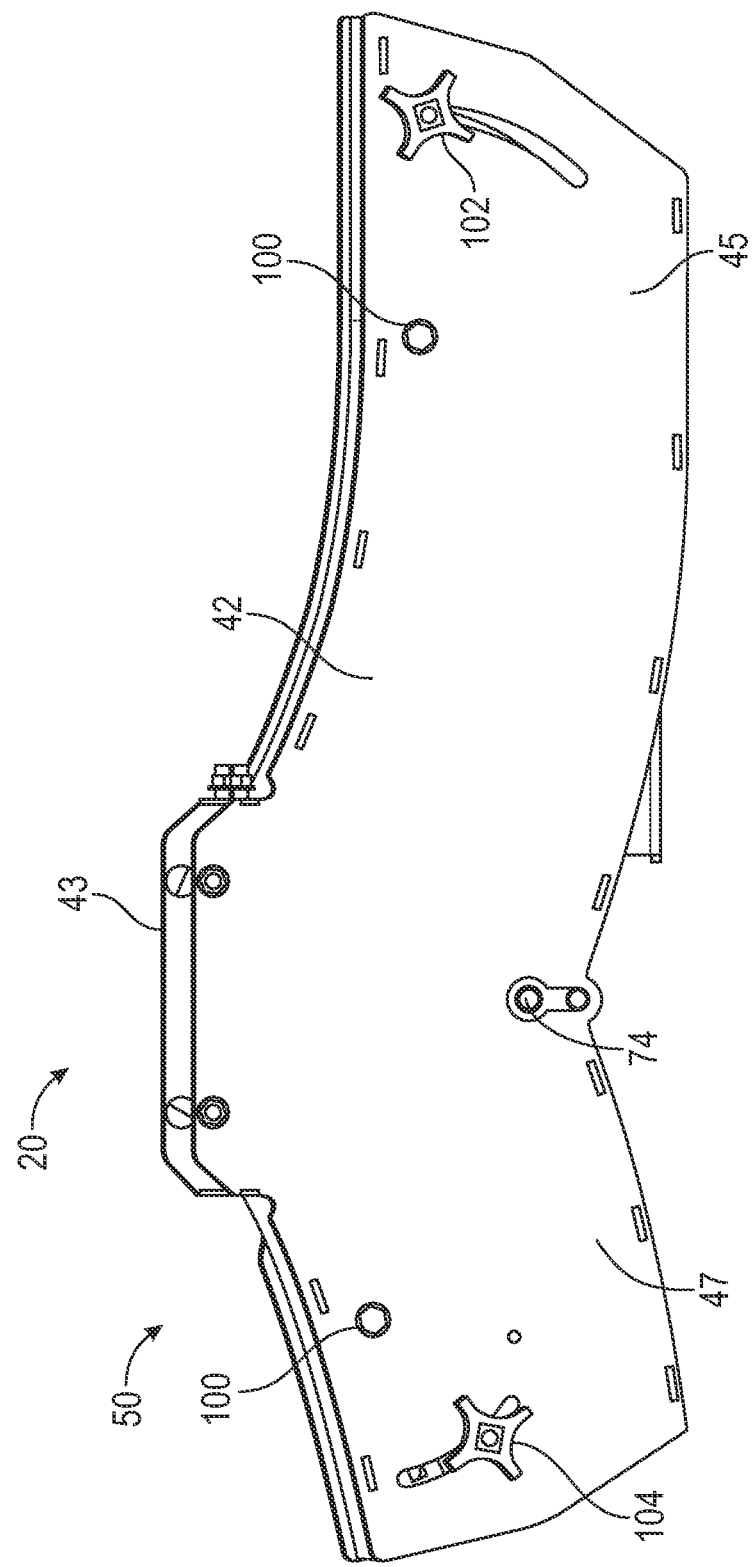
FIG. 4 is a front view of the deflector assembly of FIG. 3.
Figure 5:
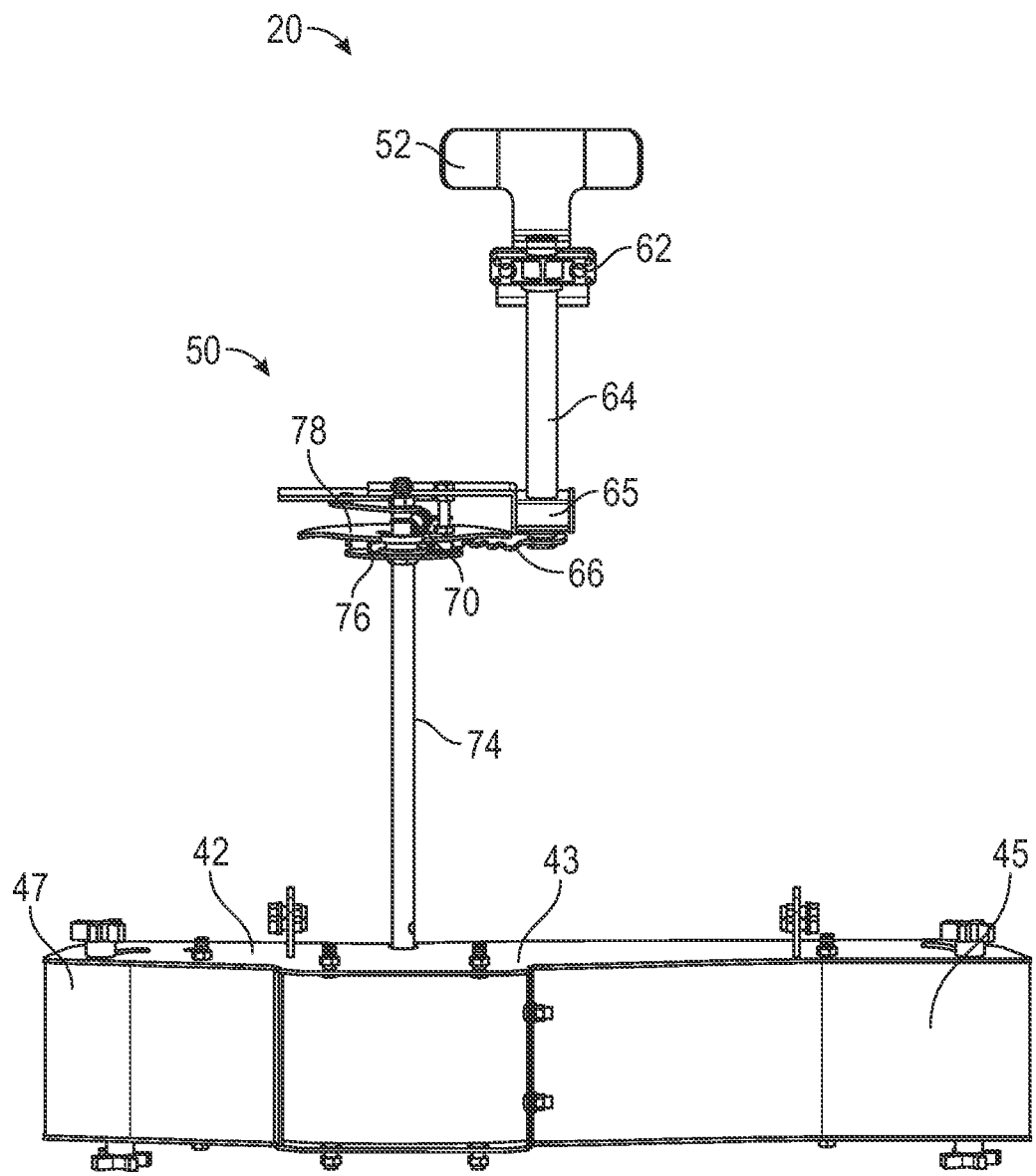
FIG. 5 is a top view of the deflector assembly of FIG. 3.
Figure 6:
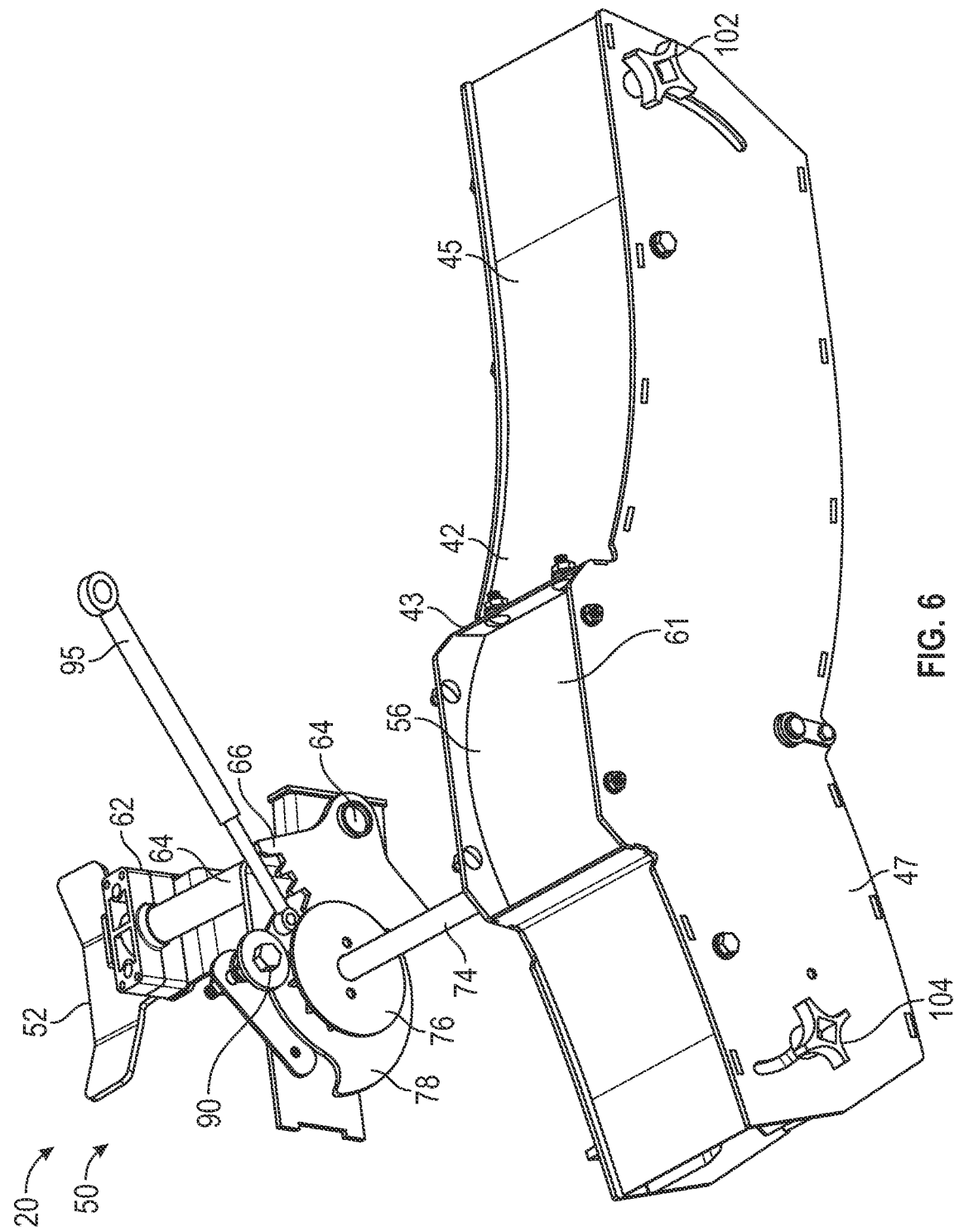
FIG. 6 a top perspective view of the deflector assembly of FIG. 3.

Referring now to FIG. 1, outdoor power equipment is depicted, according to an exemplary embodiment. The outdoor power equipment can be a stand-on blower 20, for example, which is arranged to generate and direct high velocity air that can be used to move leaves and other debris from a lawn or other surface. The blower 20 generally includes a frame or chassis 22 that supports wheels 24. The wheels 24 are used to both steer and drive the blower 20 along a ground surface. The chassis 22 further supports a prime mover, shown as internal combustion engine 26, which can provide rotational force to drive both the wheels 24 (e.g., the rear wheels) and a power take-off shaft that drives a fan or impeller 28. A fuel tank 30 is coupled to the internal combustion engine 26 to provide fuel for combustion. A muffler 32 is coupled to the internal combustion engine 26 to reduce sound and fuel emissions. In some examples, the internal combustion engine 26 only drives the power take-off shaft and impeller 28, and the wheels 24 are driven by a separate electric motor (not shown). In other examples, the prime mover is an electric motor. Accordingly, the electric motor can be used to directly power each of the wheels 24 and the power take-off shaft and impeller 28. In still other examples, the electric motor serving as the prime mover is configured to drive the power take-off shaft and impeller 28 only, and separate electric motors are provided for one or more of the wheels 24. The chassis 22 of the blower 20 supports a platform 34 that provides a standing area for a user during machine operation. A control housing 36 extends upwardly from the chassis 22. The control housing 36 receives and supports a control panel 38 that has a variety of different actuators, levers, and/or buttons that can be used to control the operation of the blower 20.

The blower 20 includes a blower housing 40 and a discharge housing 42 extending away from the blower housing 40. The blower housing 40 has a generally cylindrical shape having an air inlet 44 formed within a front surface of the blower housing 40. The air inlet 44 can include wire openings 46 or a series of fins that can selectively filter air as the air passes into the blower housing 40. The impeller 28 is positioned within the blower housing 40 and rotates with the power take-off shaft to direct air through the air inlet 44, into the blower housing 40, and downward and outward through the discharge housing 42 at high velocity. In some examples, the impeller 28 is configured to displace air at a rate of 8500 cubic feet per minute (cfm) or more, at air velocities of 165 miles per hour or more.

As depicted in FIGS. 2-10 and 17-22, the blower 20 includes a deflector assembly 50 that can adjust the airflow path between the blower housing 40 and the discharge housing 42 to adjust the direction of air discharge. The deflector assembly 50 includes an actuator, shown as pedal 52, which interacts with and controls a linkage assembly 54 to rotate a deflector 56 within the discharge housing 42. As depicted in FIGS. 2, 18, 20, and 22, the pedal 52 extends outward and above the platform 34. The pedal 52 is approximately centered, laterally, above the platform 34 so that either foot of an operator can be used to interact with the pedal 52. As explained in additional detail below, rotating the pedal 52 rotates the linkage assembly 54, which in turn adjusts the position of the deflector 56 within the discharge housing 42 to manipulate the airflow between the blower housing 40 and the discharge housing 42. The deflector 56 has a V-shaped cross section formed by a first blocking plate 57, a second blocking plate 59, and a convex inlet plate 61 that spans between the first blocking plate 57 and the second blocking plate 59. In some examples, and as depicted in FIGS. 17-22, the first blocking plate 57 and second blocking plate 59 are provided with concave curvature that helps to direct airflow through the discharge housing 42. The inlet plate 61 is sized to extend entirely across a mouth 43 in the discharge housing 42 to block airflow from the blower housing 40 into the discharge housing 42 when the deflector 56 is in the "home" position shown in FIG. 8. The deflector 56 is coupled to (e.g., welded, connected through a hex drive shaft, etc.) and configured to rotate with a deflector shaft 74 that is received opposite the inlet plate 61. The blocking plates 57, 59 and the inlet plate 61 each extend entirely across the width of the discharge housing 42 to manipulate airflow generated by the impeller 28.

The pedal 52 is mounted to the chassis 22 using a bracket 58. The bracket 58 can be welded or otherwise coupled (e.g., removably coupled with fasteners, etc.) to the chassis 22, for example. The bracket 58 includes a U-shaped mounting channel 60 and a bearing housing 62 extending upwardly away from the mounting channel 60. The bearing housing 62 receives and supports one or more bearings (not shown) that help facilitate rotation and support of a pedal shaft 64 coupled to the pedal 52. The pedal shaft 64 extends away from the pedal 52, through the bearing housing 62, and toward and through a second bearing housing 65 spaced apart from the first bearing housing 62 on the bracket 58.

A fan-shaped gear 66 (e.g., a quadrant gear) is positioned on an end of the pedal shaft 64 opposite the pedal 52. The fan-shaped gear 66 includes a series of gear teeth 68 that mesh with and interact with gear teeth 72 on a spur gear 70 that is used to control a position of the deflector 56. The fan-shaped gear 66 includes a higher gear ratio than the spur gear 70 so that rotation of the fan-shaped gear 66 will impart even greater rotation of the spur gear 70 and, in turn, a deflector shaft 74 that is coupled to the deflector 56 (e.g., directly welded to or removably coupled with a hex key drive shaft assembly, for example). In some examples, the fan-shaped gear 66 and spur gear 70 are chosen to have a gear ratio of between about 2:1 and 5:1. As depicted in FIGS. 2-10, the fan-shaped gear 66 and spur gear 70 are arranged so that rotating the pedal 52 (which rotates the pedal shaft 64 and the fan-shaped gear 66) about 30 degrees (e.g., +/−5 degrees) rotates the deflector 56 (via the spur gear 70 and deflector shaft 74) between about 50 degrees and about 80 degrees. In some examples, the deflector 56 is arranged to rotate over a sweep of about 146 degrees in response to about 30 degree rotation of the pedal 52 and pedal shaft 64 in either direction. In some examples, the allowable rotation in the first direction (e.g., clockwise) is slightly greater than the allowable rotation in the second direction. For example, the pedal 52 may rotate 31 degrees in a first direction to impart 75 degrees of rotation to the deflector 56 and 30 degrees in a second direction to impart 74 degrees of rotation to the deflector 56. In other examples, the deflector 56 is configured to rotate approximately 73 degrees in each direction, over a total sweep of 146 degrees.

Figure 23:
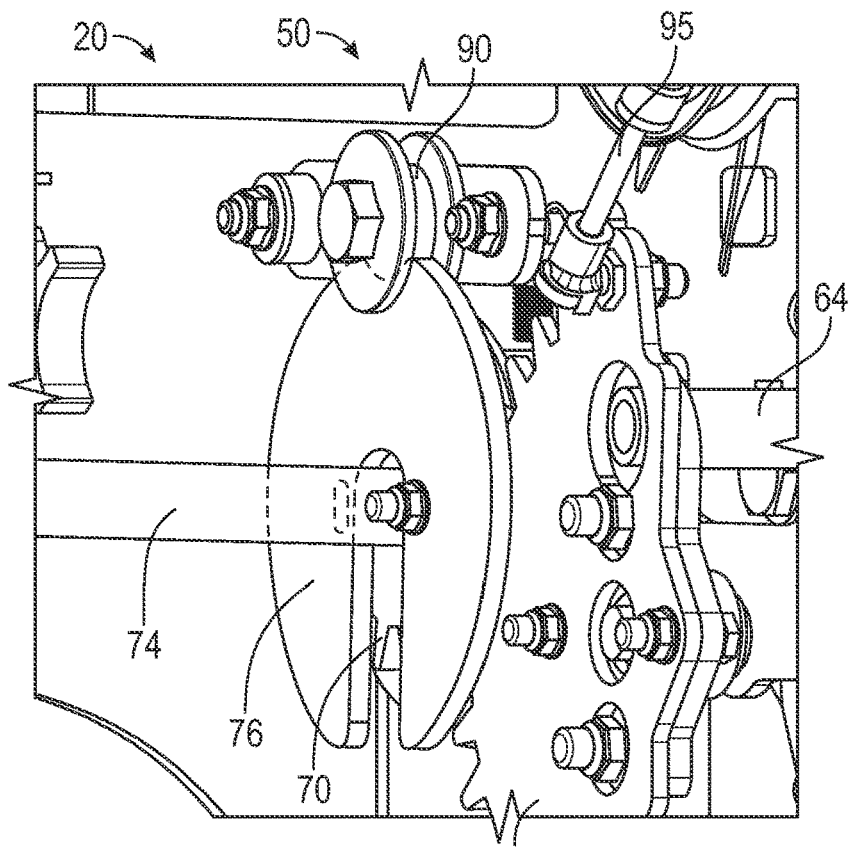
FIG. 23 is a front perspective detailed view of the linkage assembly of FIG. 11, detailing a damper connection to a first gear of the gear assembly of FIG. 10.
Figure 24:
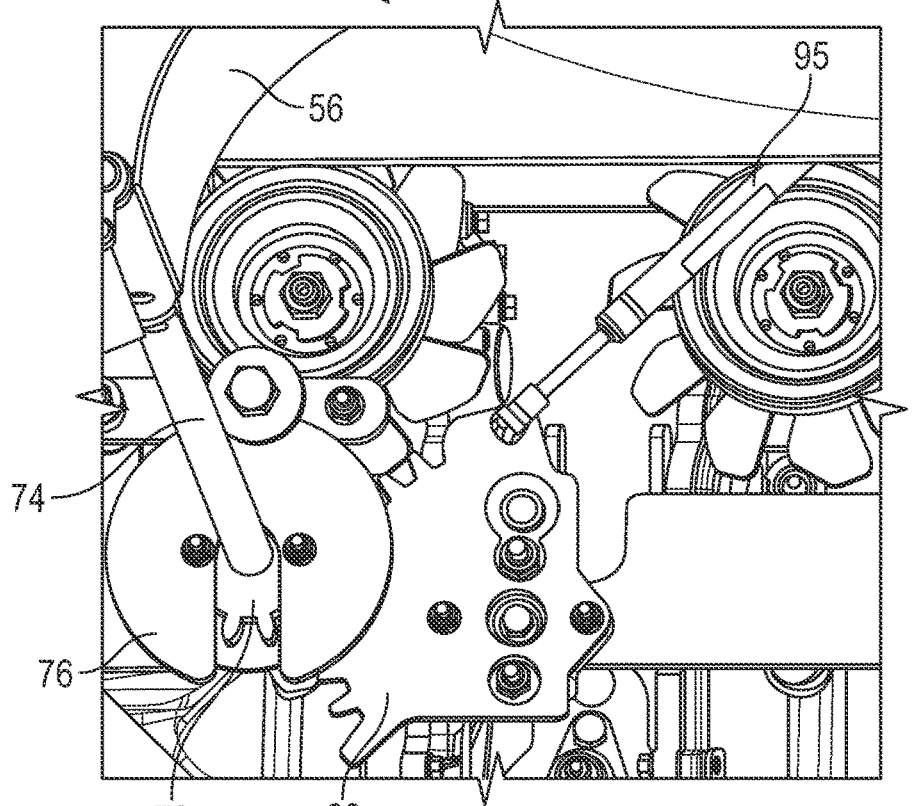
FIG. 24 is front, bottom perspective view of the linkage assembly of FIG. 23.

As depicted in FIGS. 2-6 and 23-24, the position and mesh between the gears 66, 70 is at least partially controlled by a mesh plate 76 and locking plate 78 assembly. The mesh plate is positioned forward of each of the gears 66, 70 and is arranged to oppose axial movement of either gear 66, 70 that might otherwise cause the gear teeth 68, 72 to disengage one another and slip. In some examples, the mesh plate 76 is welded to the deflector shaft 74. Alternatively, and as shown in FIGS. 23-24, the mesh plate 76 is indirectly coupled to the deflector shaft 74 through the spur gear 70. The mesh plate 76 can engage (e.g., using bolts shown in FIGS. 23-24) and/or be welded to the front surface of the spur gear 70 as well. The locking plate 78 opposes the mesh plate 76, and is used to move the deflector 56 between three discrete positions. As will be described in additional detail below, the locking plate 78 is configured to position and secure the deflector 56 within the discharge housing 42 in each of a first position (e.g., rotated left), a second position (e.g., rotated right), and a third position (e.g., neutral, or "home") to create different flow paths between the blower housing 40 and the discharge housing 42. Like the mesh plate 76, the locking plate 78 can be welded or otherwise coupled to the spur gear 70. In some examples, the locking plate 78 is engaged with the rear surface of the spur gear 70 so that the locking plate 78 and mesh plate 76 sandwich the spur gear 70.

With additional reference to FIGS. 11-14, the locking plate 78 is depicted. The locking plate 78 is defined by a generally circular body having two laterally-extending wings 80, 82 and a detent 84. The laterally-extending wings 80, 82 extend outwardly from both sides of the body to form two concave stops 86, 88. The detent 84, which is formed in the top of the body, defines a pocket as well. The detent 84 and concave stops 86, 88 are each designed to interact with and secure a positioning pin 90 that is biased into engagement with the locking plate 78 by a spring 92, as explained below. In other examples, the wings 80, 82 can be omitted.

Figure 8:
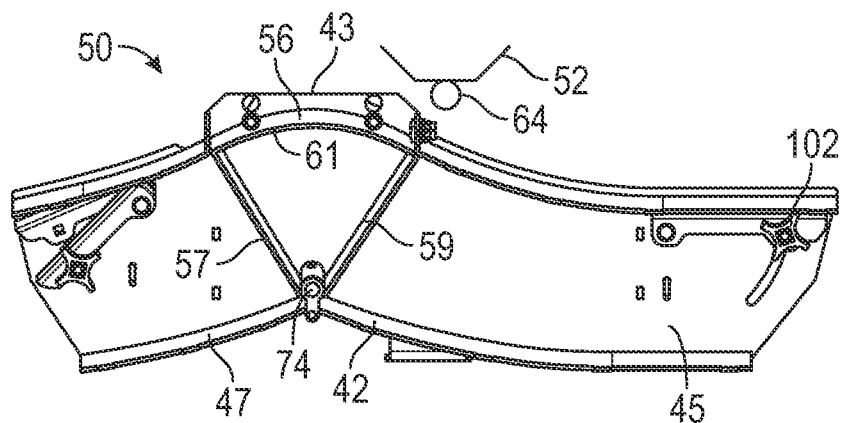
FIG. 8 is a front view of the discharge housing of the deflector assembly of FIG. 3, shown with the deflector in a second position.
Figure 17:
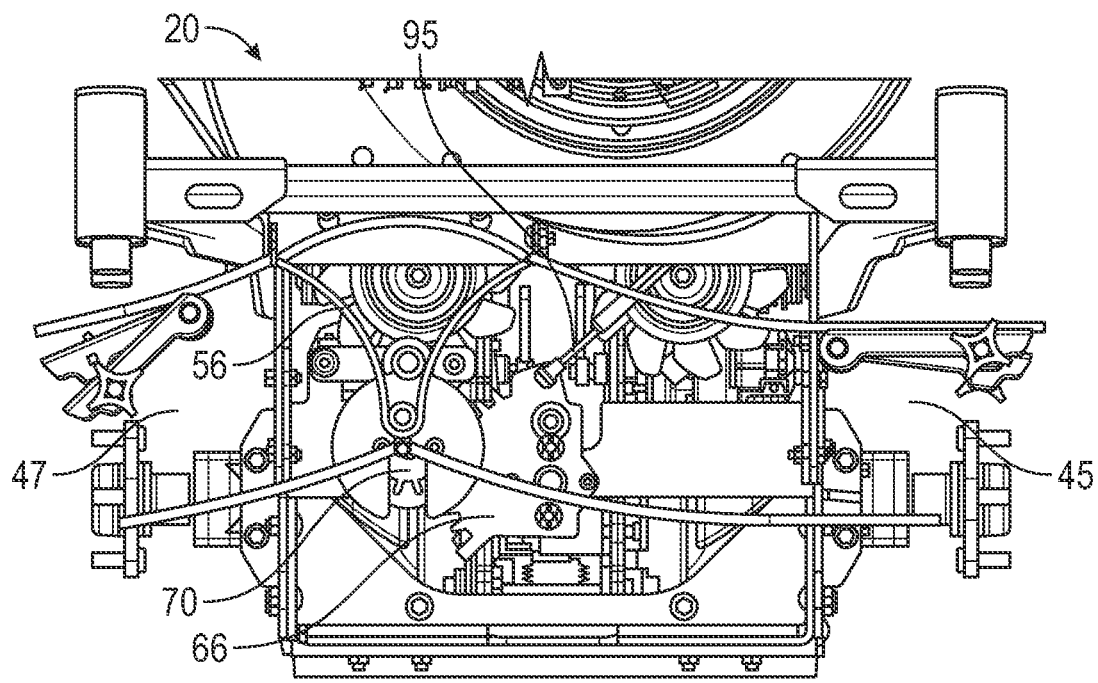
FIG. 17 is a front view of another blower with a front of the discharge housing removed to show the deflector in the home or neutral position, according to an exemplary embodiment.
Figure 18:
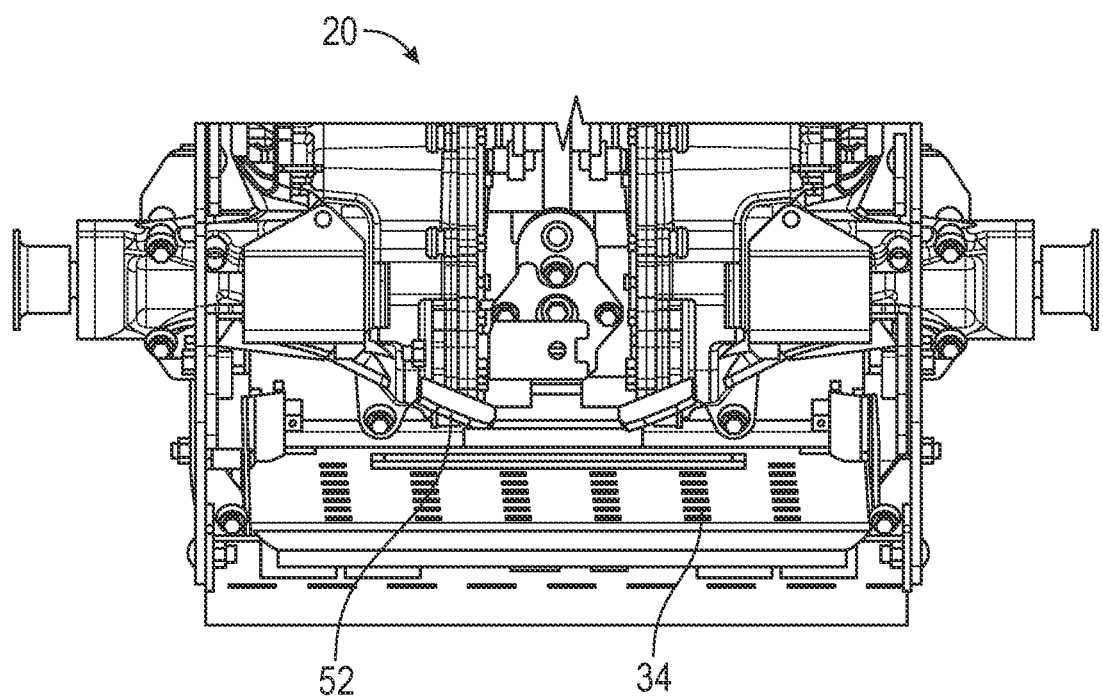
FIG. 18 is a rear view of the blower of FIG. 17, showing a position of the pedal corresponding to the home or neutral position of the deflector.

Referring to FIGS. 2-6 and 17-22, the operation and control of the deflector assembly 50 is detailed. As depicted in FIGS. 2-6 and 18, the pedal 52 is positioned in a "home" position. In the home position, a base of the pedal 52 is oriented approximately parallel to a surface of the platform 34, which in turn orients the deflector 56 vertically as shown in FIGS. 8 and 17. When the deflector 56 is in the home position, the inlet plate 61 extends across the mouth 43 in the discharge housing 42 to block airflow from the blower housing 40 (e.g., high velocity air generated by the impeller 28) from entering into the discharge housing 42.

Figure 13:
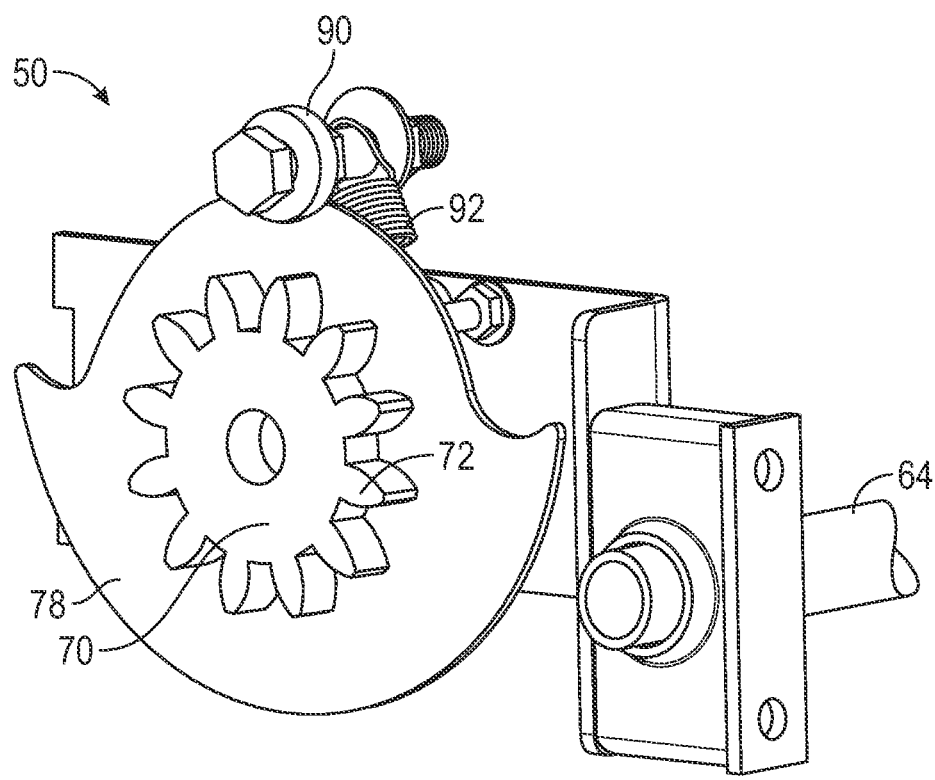
FIG. 13 is a front perspective view of a locking plate and spur gear of the linkage assembly of FIG. 12, with a fan-shaped gear removed.
Figure 14:
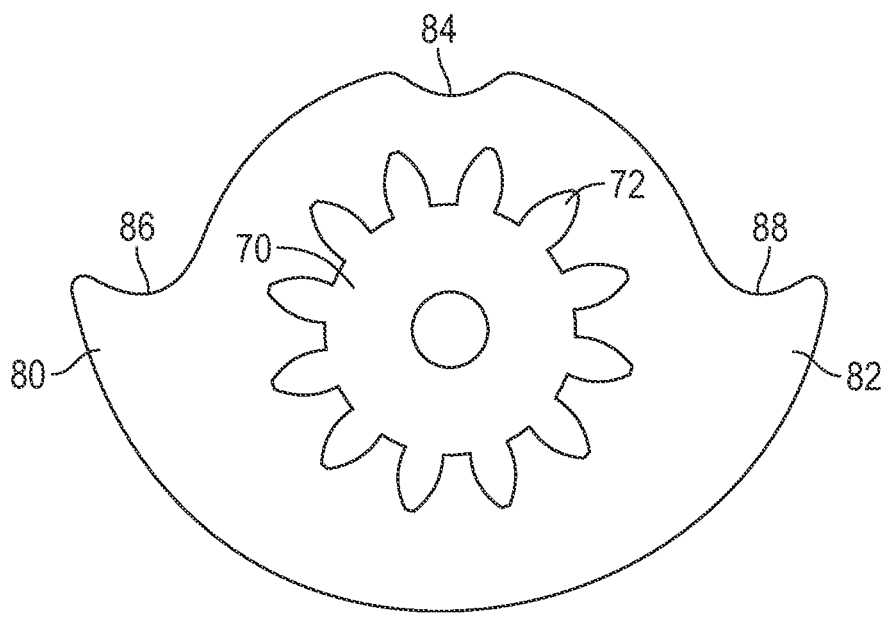
FIG. 14 is a front view of the locking plate and spur gear of FIG. 13.

The deflector 56 is maintained in its vertical orientation using the locking plate 78 and positioning pin 90. As depicted in FIGS. 13-14, the locking plate 78 includes a detent 84 that is centered along the top of the locking plate 78. The positioning pin 90 is biased downward, into engagement with the detent 84 by the spring 92, which is coupled to a bracket 94 that extends away from the chassis 22. The downward force applied by the spring 92 pulls the positioning pin 90 toward the detent 84, which then restricts and resists rotation of the locking plate 78. Because the locking plate 78 is coupled to the spur gear 70, maintaining the orientation of the locking plate relative to the bracket 94 and chassis 22 secures the deflector 56 in the vertical, home position.

Figure 7:
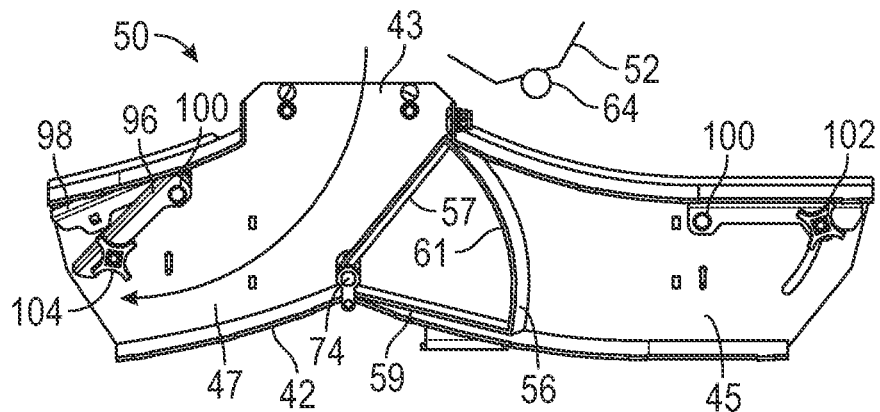
FIG. 7 is a front view of a discharge housing of the deflector assembly of FIG. 3, shown with a deflector in a first position.
Figure 19:
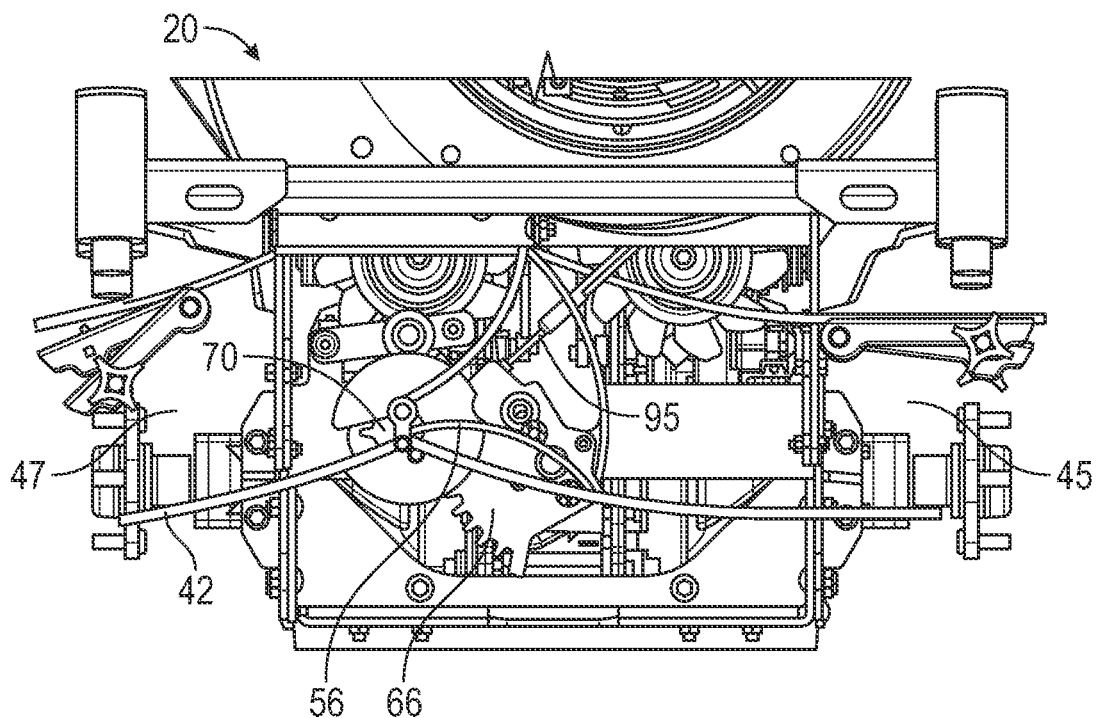
FIG. 19 is a front view of the blower of FIG. 17, showing the deflector in a first lateral position.
Figure 20:
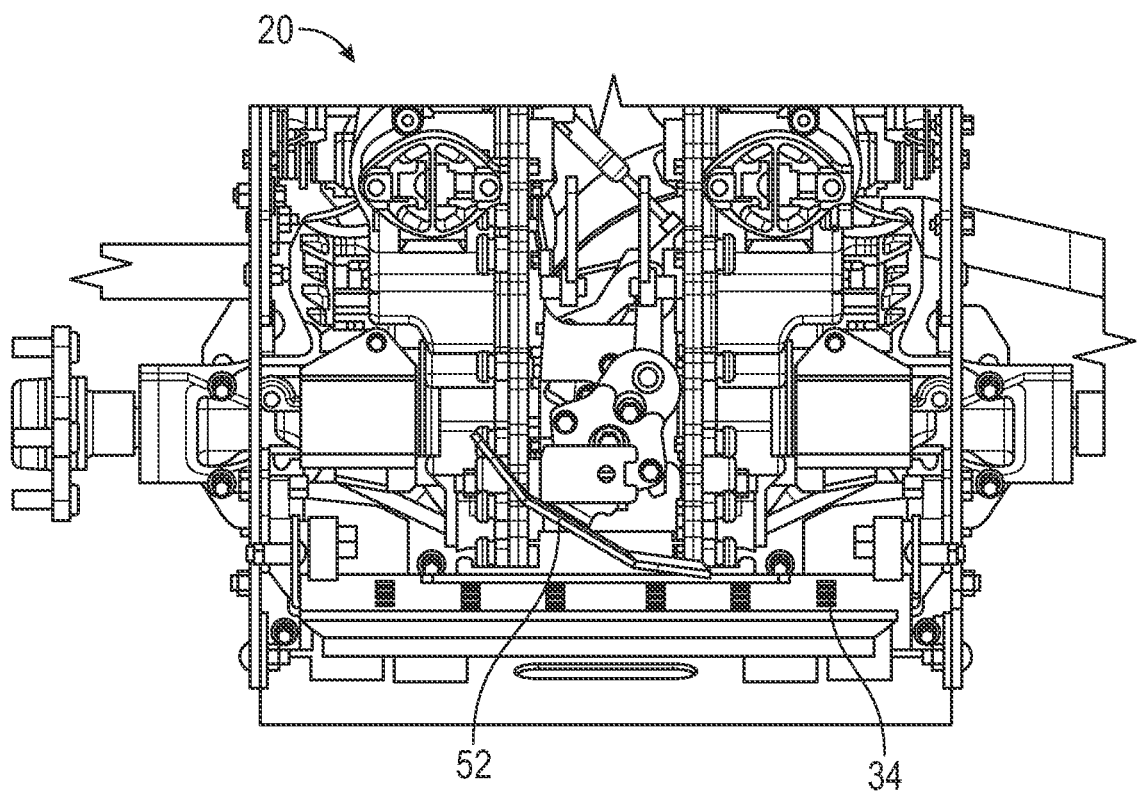
FIG. 20 is a rear view of the blower of FIG. 19, showing a position of the pedal that will move the deflector to the first lateral position.

The deflector 56 is rotated by stepping on or otherwise rotating the pedal 52. For example, and as depicted in FIGS. 7 and 19-20, a user can step on a right side of the pedal 52. Stepping on the right side of the pedal 52 rotates the pedal shaft 64 about the bearing housings 62, 65. Because the fan-shaped gear 66 is rigidly coupled (e.g., welded) to the pedal shaft 64, rotation of the pedal 52 similarly rotates the fan-shaped gear 66 relative to the chassis 22.

Figure 21:
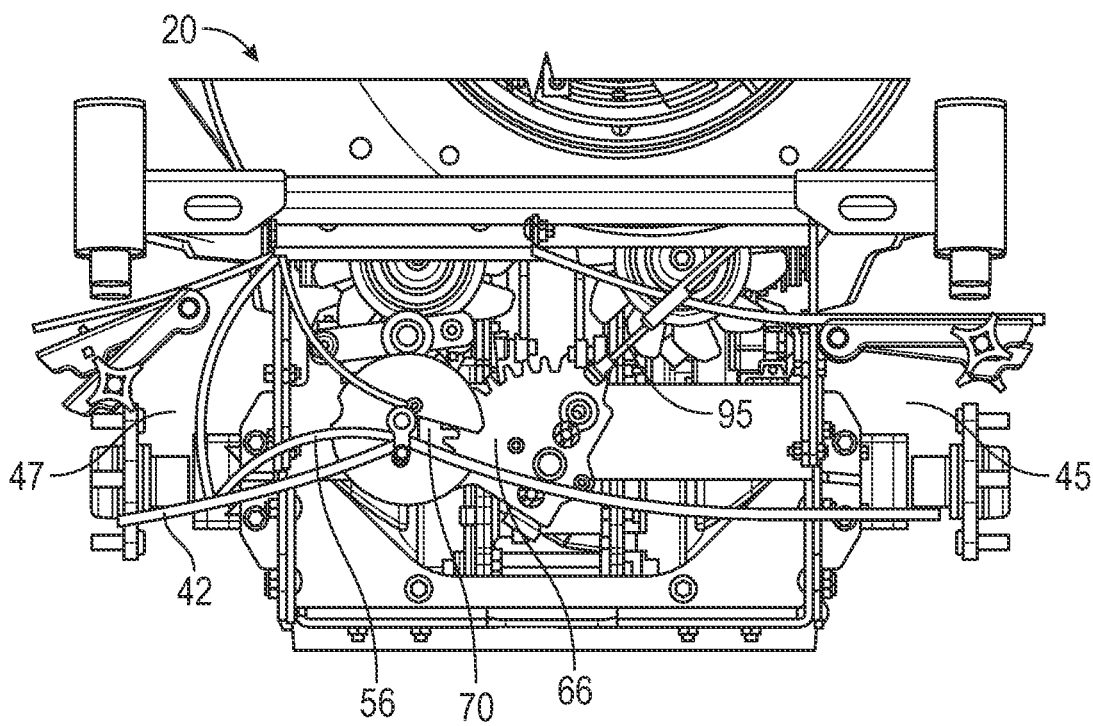
FIG. 21 is a front view of the blower of FIG. 17, showing the deflector in a second lateral position.
Figure 22:
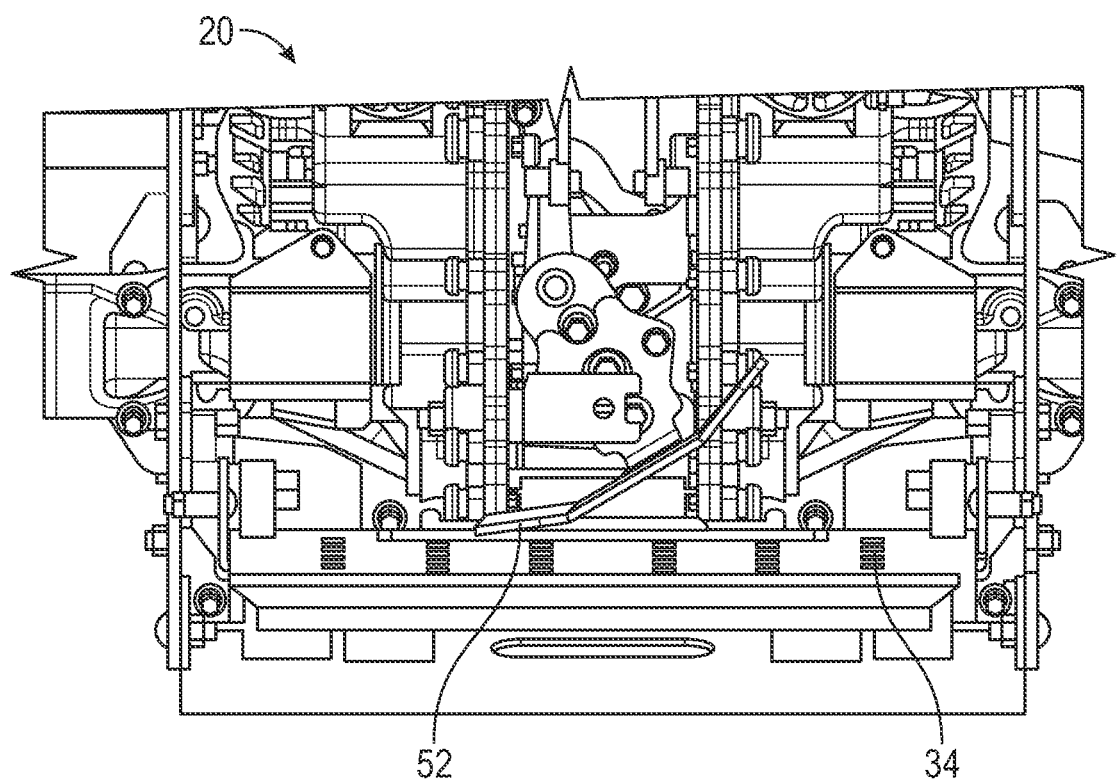
FIG. 22 is a rear view of the blower of FIG. 21, showing a position of the pedal that will move the deflector to the second lateral position.

Rotation of the fan-shaped gear 66 in a first direction (e.g., counterclockwise) imparts rotation of the deflector shaft 74 in a second, opposite direction (e.g., clockwise). Initially, the engagement between the positioning pin 90 and the detent 84 of the locking plate 78 will oppose rotation of the locking plate 78 and spur gear 70 relative to the fan-shaped gear 66 and pedal shaft 64. When a threshold force is applied to the pedal 52 that is sufficient to overcome the bias of the spring 92 and sufficient to overcome the engagement between the detent 84 and the positioning pin 90, the locking plate 78 begins to rotate. Once the positioning pin 90 leaves the detent 84, the locking plate 78 can then rotate relative to the chassis 22. The gear ratio between the gears 66, 70 allows for a smaller rotation of the pedal 52 and pedal shaft 64 (e.g., about 30 degrees rotation) to translate into a larger rotation of the deflector shaft 74 and deflector 56 (e.g., about 75 degrees rotation). When the right side of the pedal 52 is pressed and the pedal shaft 64 rotates clockwise (as shown in FIG. 20), the fan-shaped gear 66 urges the spur gear 70 to rotate counterclockwise, to the first lateral position shown in FIGS. 7 and 19. When the left side of the pedal 52 is pressed and the pedal shaft 64 rotates counterclockwise (as shown in FIG. 22), the fan-shaped gear 66 urges the spur gear 70 to rotate clockwise, to the second lateral position shown in FIGS. 9 and 21.

The deflector 56 is secured into each of the lateral positions (e.g., the first lateral position shown in FIGS. 7 and 19 and the second lateral position shown in FIGS. 9 and 21) using a combination of gravity, airflow from the impeller 28 through the blower housing 40 and mouth 43 of the discharge housing 42, and in some embodiments, the locking plate 78. As the locking plate 78 and deflector 56 begin to rotate in either direction away from the neutral, home position, the inlet plate 61 of the deflector 56 transitions away from the mouth 43 of the discharge housing 42. Air begins to pass through a gap formed between the deflector 56 and the mouth 43, such that high velocity air from the impeller 28 begins to pass from the blower housing 40 downward, into the discharge housing 42. As the size of the opening within the mouth 43 increases, the amount of airflow through the discharge housing 42 increases. The combination of high velocity air and gravity causes the deflector 56 to continue rotating until the deflector 56 arrives at one of the first or second lateral positions, shown in FIGS. 7 and 19 and 9 and 21, respectively. The stops 86, 88 formed on the wings 80, 82 prevent over-rotation by engaging the positioning pin 90. Similarly, the size and shape of the blower housing 42 further restricts rotation of the deflector 56, as the blocking plates 57, 59 can engage the bottom surfaces of the discharge housing 42 if the locking plate 78 (e.g., one of the wings 80, 82) fails. In some embodiments, contact between the deflector 56 and the discharge housing 42 can be used to stop the deflector 56 from over-rotation, such that the wings 80, 82 and associated stops 86, 88 can be omitted from the locking plate 78. The use of a damper 95, explained in further detail below, can reduce the speed of the deflector 56 as it moves within the discharge housing 42.

The deflector assembly 50 is arranged so that the pedal 52 will be intuitive to use. For example, if a user steps on or otherwise manipulates the pedal 52 to rotate clockwise (as depicted in FIG. 20), the deflector 56 rotates counterclockwise, to the first lateral position shown in FIGS. 7 and 19. In the first lateral position, the positioning pin 90 engages the stop 86 formed by the wing 80 of the locking plate 78. In the first lateral position, the deflector 56 is arranged so that the first blocking plate 57 extends across and inhibits airflow from the mouth 43 of the discharge housing 42 leftward, through a first discharge chute 45. By extending across the first discharge chute 45 and angling toward a second discharge chute 47, the first blocking plate 57 effectively directs high velocity air from the blower housing 40 outward through the second discharge chute 47. Accordingly, pressure losses are limited and high velocity air is directed through the second discharge chute 47 and out of the discharge housing 42 entirely, where it can then be used to displace leaves and/or debris. In summary, rotating the pedal 52 clockwise will rotate the deflector 56 counterclockwise, which opens the second discharge chute 47 and causes high velocity air to exit from the right side of the blower 20, as depicted in FIGS. 7 and 19.

The deflector assembly 50 can be moved from the first lateral position shown in FIG. 7 by rotating the pedal 52 in the opposite (e.g., counterclockwise) direction. Rotating the pedal 52 counterclockwise rotates the deflector 56 clockwise, toward the home position shown in FIGS. 8 and 17. The positioning pin 90 is biased downward, toward the locking plate 78, by the spring. As the locking plate 78 rotates clockwise from the first lateral position, the deflector 56 and locking plate 78 will reach the neutral, home position shown in FIGS. 8 and 17. The positioning pin 90 will be pulled downward, into engagement with the detent 84 in the locking plate 78. Accordingly, the locking plate 78 and deflector 56 may pause at the home position before continuing to rotate toward the second lateral position shown in FIGS. 9 and 21.

Figure 9:
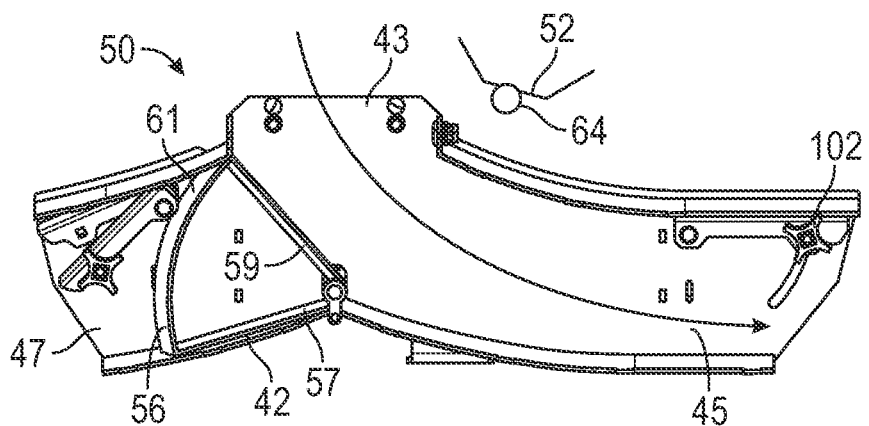
FIG. 9 is a front view of the discharge housing of the deflector assembly of FIG. 3, shown with the deflector in a third position.
Figure 10:
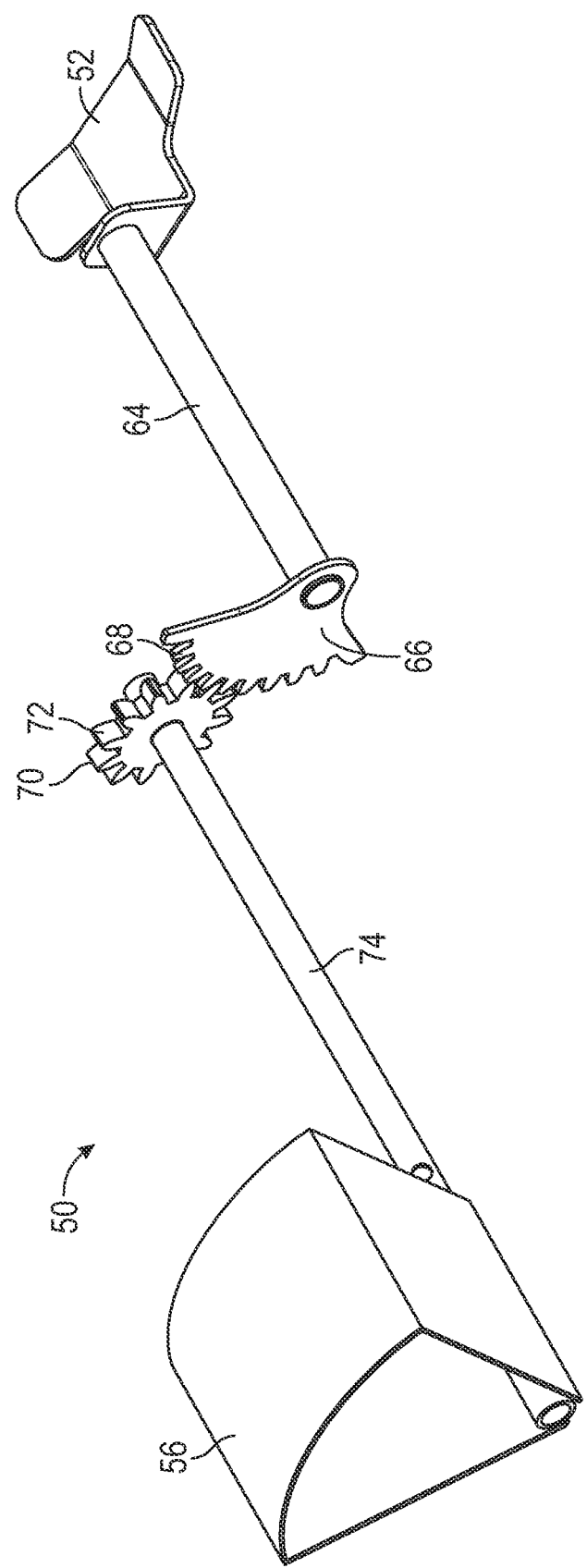
FIG. 10 is a top perspective view of a gear assembly used to control a position of the deflector of FIG. 7 with an actuator.
Figure 11:
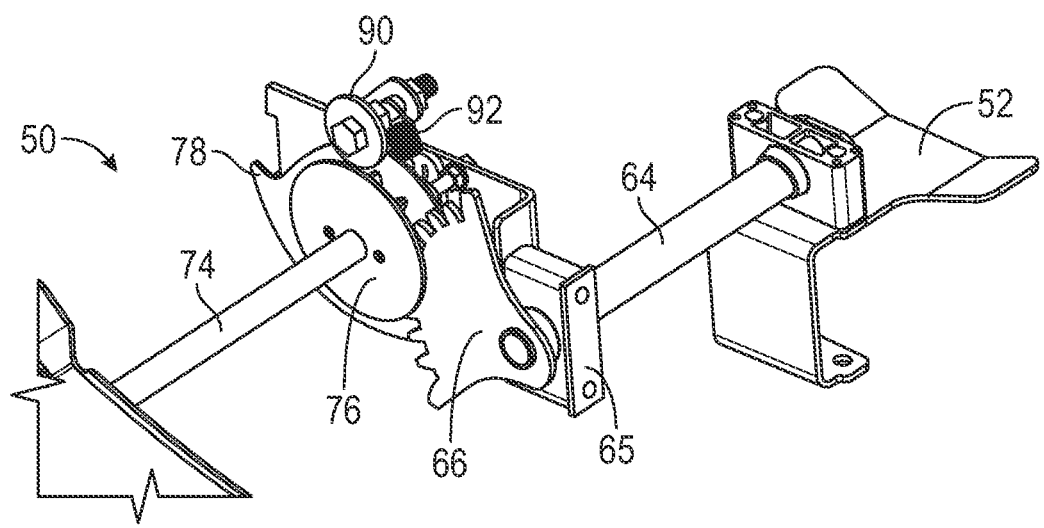
FIG. 11 is a partial perspective view of a linkage assembly that includes the gear assembly of FIG. 10.
Figure 12:
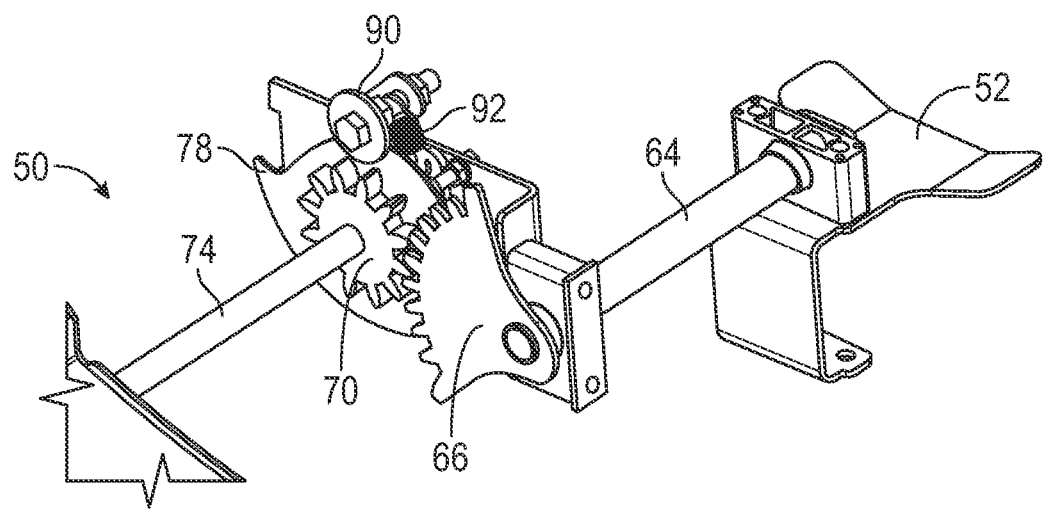
FIG. 12 is a partial perspective view of the linkage assembly of FIG. 11, shown with a mesh plate removed.

Continued counterclockwise rotation of the pedal 52 (shown in FIG. 22) continues the clockwise rotation of the locking plate 78, deflector shaft 74, and deflector 56. Once the bias of the spring 92 is overcome and the positioning pin 90 exits the detent 84 within the locking plate, the deflector 56 and locking plate 78 can freely rotate further in the clockwise direction. The locking plate 78 and deflector 56 continue to rotate clockwise until the positioning pin 90 engages the stop 88 formed by the wing 82 in the locking plate 78. In the second lateral position, and as shown in FIGS. 9 and 21, the deflector 56 is arranged so that the second blocking plate 59 extends across and inhibits airflow from the mouth 43 of the discharge housing 42 rightward, through the second discharge chute 47. By extending across the second discharge chute 47 and angling toward the first, longer discharge chute 45, the second blocking plate 59 effectively directs high velocity air from the blower housing 40 outward through the first discharge chute 45. Accordingly, pressure losses are limited and high velocity air is directed through the first discharge chute 45 and out of the discharge housing 42 entirely, where it can then be used to displace leaves and/or debris. In summary, rotating the pedal 52 counterclockwise will rotate the deflector 56 clockwise, which opens the first discharge chute 45 and causes high velocity air to exit from the left side of the blower 20, as depicted in FIGS. 9 and 21. The combined force of gravity and air velocity through the first discharge chute 45 will maintain the deflector 56 in the second lateral position until a clockwise force is imparted onto the pedal 52. Accordingly, the user does not need to constantly stand on the pedal 52 to maintain the desired blower airflow orientation.

In some examples, the deflector assembly 50 includes additional features that can help to control the positioning of the locking plate 78 and deflector 56. As depicted in FIGS. 3, 6, and 17-24, the deflector assembly 50 further includes a damper 95. The damper 95 can be pivotally mounted to the chassis 22 on one end and coupled to the locking plate 78 or fan-shaped gear 66 on the opposite end. The damper 95 can be a dashpot-style damper, for example, that is configured to oppose rapid motion of the locking plate 78 and deflector 56 relative to the chassis 22 using viscous friction. In some examples, once the positioning pin 90 disengages with the detent 84 of the locking plate 78, the high velocity air passing onto one of the first blocking plate 57 or the second blocking plate 59 will begin to urge the deflector 56 to rotate rapidly. The damper 95 reduces the rotational speed of the locking plate 78 and deflector 56 so that unwanted impacts between the deflector 56 and the discharge housing 42 are limited or avoided entirely. Accordingly, the deflector 56 can translate between the home position and each of the first and second lateral positions in a controlled manner. As depicted in FIGS. 23-24, the damper 95 can be pivotally mounted directly to the fan-shaped gear 66.

In some examples, the blower 20 includes additional features that can help further shape the airflow path through and out of the discharge housing 42. As depicted in FIGS. 2-9 and 17-22, each of the first discharge chute 45 and the second discharge chute 47 include one or more adjustable flow deflectors 96, 98. The adjustable flow deflectors 96, 98 are positioned proximate an outlet of each of the discharge chutes 45, 47 and are configured to direct high velocity air out of the discharge housing at differing angles. The adjustable flow deflectors 96, 98 are pivotally coupled to the discharge housing 42, and are configured to rotate about a common pivot pin 100. The position of the adjustable flow deflectors 96, 98 is controlled by dedicated knobs 102, 104 that extend through slots 106, 108 formed in the discharge housing 42. Tightening the knobs 102, 104 (e.g., with clockwise rotation) will releasably secure the adjustable flow deflector 96, 98 associated with the knob 102, 104 into position. Likewise, loosening the knobs 102, 104 (e.g., with counterclockwise rotation) will release the adjustable flow deflector 96, 98 associated with the knob 102, 104, which will then rotate within the slot 106, 108 to a new position.

The adjustable flow deflectors 96, 98 can be rotated about the pivot pin 100 to a desired angular orientation within the discharge housing 42. In some examples, and as depicted in FIGS. 7-9, the front adjustable flow deflector 96 can be angled toward the ground at a first angle (e.g., about 60 degrees), while the rear adjustable flow deflector 98 can be angled toward the ground at a second angle (e.g., about 30 degrees), less than the front adjustable flow deflector 96. Using this series of offset angles, the blower 20 can effectively perform a two-stage debris removal process. As the blower 20 drives forward, high velocity air shaped by the front adjustable flow deflector 96 will first push objects near the blower 20 outward, away from the blower 20. The significant vertical component of the airflow from the front adjustable flow deflector 96 can help to initially dislodge debris. As the blower 20 continues traveling forward, the airflow shaped by the rear adjustable flow deflector 98 will then push the objects still further away from the blower 20, as the airflow has a more significant horizontal component. Various other flow deflector 96, 98 positions can be used to perform other tasks. In some examples, each of the flow deflectors 96, 98 can be positioned at approximately the same angle relative to the ground below. As shown in FIGS. 7-9, the adjustable flow deflectors 96, 98 in the first discharge chute 45 operate independently of the adjustable flow deflectors 96, 98 in the second discharge chute 47, such that the shape and orientation of each adjustable flow deflector 96, 98 can differ to meet a user's needs.

Figure 15:
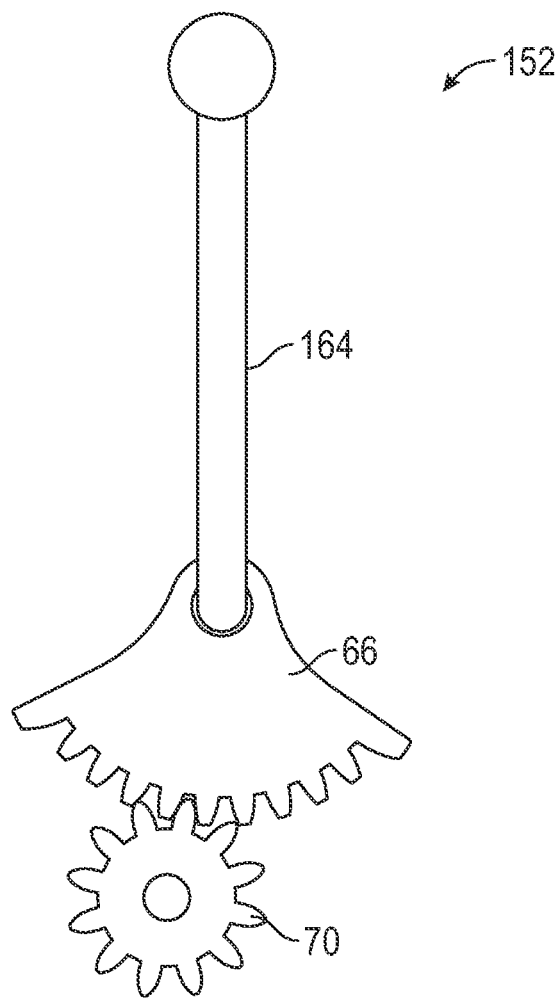
FIG. 15 is a front view of an alternative gear assembly that can be used to control the position of the deflector of FIG. 7.
Figure 16:
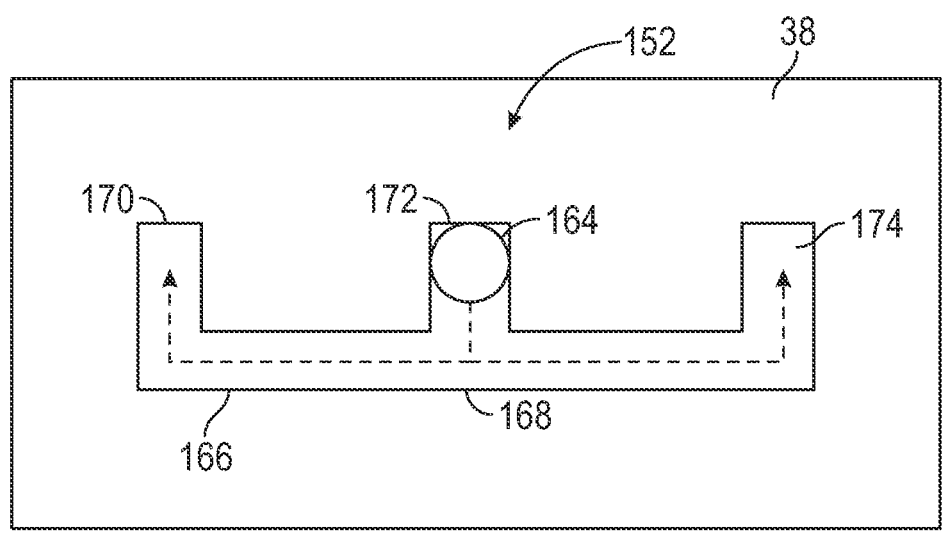
FIG. 16 is a schematic view of a lever track that can be used to control the gear assembly of FIG. 15.

Various modifications can be made to the deflector assembly 50 as well. For example, although the pedal 52 has been repeatedly described as controlling the positioning of the deflector 56, a hand-operated actuator 152 can also be used to control the deflector 56. As depicted in FIGS. 15-16, the deflector assembly 50 includes a lever 164 that functions as the pedal shaft 64. The lever 164 extends upward, through the control housing 36 to the control panel 38. The opposite end of the lever 164 is coupled to the fan-shaped gear 66, which is again engaged with the spur gear 70. Accordingly, rotation of the lever 164 rotates the fan-shaped 66, which in turn rotates the spur gear 70, deflector shaft 74, and deflector 56.

The lever 164 can be provided with a lever track 166 within the control panel 38 to position the deflector 56 in each of the home position (shown in FIGS. 8 and 17), the first lateral position (shown in FIGS. 7 and 19), and the second lateral position (shown in FIGS. 9 and 21). As depicted in FIG. 16, the lever track 166 includes a lateral component 168 and three distinct locking tracks 170, 172, 174 that extend axially away from the lateral component 168. The locking tracks 170, 172, 174 correspond to the home position, first lateral position, and the second lateral position, respectively. As explained above, the lever 164 can be arranged for intuitive operation. Accordingly, aligning the lever 164 within the left-most locking track 170 will align the deflector 56 so that high velocity air is directed leftward, out of the first discharge chute 45. Aligning the lever 164 within the center locking track 172 will align the deflector 56 so that high velocity air is blocked from entering into the mouth 43 of the discharge housing 42. Aligning the lever 164 within the right-most locking track 174 will align the deflector so that high velocity air is directed rightward, out of the second discharge chute 47.

Still additional modifications can be made the deflector assembly 50. For example, although described as having three distinct locking positions, the deflector assembly 50 can be provided with more or less positions. For example, the locking plate 78 can be equipped with two or more detents 84 that are spaced apart from one another on the body of the locking plate 78. Accordingly, the positioning pin 90 and spring 92 can create a series of intermediate deflector 56 positions within the discharge housing 42. In still other examples, the locking plate 78 can be removed and a clutch-style engagement can be used to position the deflector 56. Various other types of positioning mechanisms can be used as well. In some examples, the lever 164 can include a bevel gear (not shown) that is used to transmit rotational force through the lever 164 and to the spur gear 70, deflector shaft 74, and deflector 56. In still other embodiments, different deflector positioning mechanisms can be used, including mechanisms that can direct high velocity air along multiple axes. For example, the deflector 56 can be moved to a position where high velocity air is directed forward, in addition to each of the lateral directions, providing three distinct air flow paths through the discharge housing 42. In some examples, the discharge housing 42 is modified so that an additional front discharge chute extends forward from the blower 20.

Using the above described blower 20 and deflector assembly 50, an inexpensive, reliable, and highly responsive manual system is created. The deflector assembly 50 can readily position the deflector 56 in several discrete positions to adjust airflow from the blower housing 40, to and through the discharge housing 42. The incorporation of several adjustable flow deflectors 96, 98 within the discharge housing 42 provides even further manual control of the airflow generated by the impeller 28. The deflector assembly 50 is much more cost-effective than other adjustable blower assemblies that incorporate expensive electric motors and/or control systems that might be otherwise subject to failure and difficult to override. The weight of the blower 20 is reduced by eliminating additional electric motors as well, again improving the overall performance of the blower 20. The deflector assembly 50 can be incorporated into various other types of outdoor power equipment as well. For example, the deflector assembly can be used to adjust a discharge direction of a lawnmower or snow blower as well.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

The construction and arrangement of the deflector assembly as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A ride-on blower comprising:
   a chassis;
   a blower housing;
   a discharge housing coupled to the blower housing, the discharge housing including a first discharge chute having a first chute exit and a second discharge chute having a second chute exit;
   an impeller received within the blower housing and configured to rotate within the blower housing to direct air from the blower housing to the discharge housing, wherein the first chute exit is positioned to discharge air flow generated by the impeller to a first side of the chassis and the second chute exit is positioned to discharge air flow generated by the impeller to a second side of the chassis; and
   a deflector assembly comprising:
      an actuator movable among at least two positions;
      a deflector movable within the discharge housing in response to movement by the actuator;
      an actuator shaft extending away from the actuator; and
      a deflector shaft extending away from the deflector;
      wherein the actuator shaft is coupled to the deflector shaft through a geared connection, the geared connection is defined by a first gear coupled to the actuator shaft and a second gear coupled to the deflector shaft, wherein rotation of the first gear by the actuator shaft rotates the second gear and the deflector shaft, wherein the second gear is coupled to a locking plate, wherein the locking plate is configured to secure the deflector in at least two discrete positions within the discharge housing using a positioning pin that is biased toward the chassis;
   wherein movement of the actuator to a first position rotates the deflector to direct the air flow generated by the impeller through the first discharge chute; and
   wherein movement of the actuator to a second position rotates the deflector to direct the air flow generated by the impeller through the second discharge chute.

2. The ride-on blower of claim 1, wherein the first gear and the second gear have a gear ratio of between 2:1 and 5:1.

3. The ride-on blower of claim 1, wherein the first gear is a fan-shaped gear and the second gear is a spur gear.

4. The ride-on blower of claim 1, wherein the locking plate is defined by a body including a detent, wherein the detent defines a concave recess that selectively receives the positioning pin to restrict rotation of the locking plate.

5. The ride-on blower of claim 1, wherein the deflector is rotatable between the first position, a home position, and the second position, wherein in the first position, the deflector blocks airflow from the blower housing into the second discharge chute and directs airflow from the blower housing into the first discharge chute;
   wherein in the second position, the deflector blocks airflow from the blower housing into the first discharge chute and directs airflow from the blower housing into the second discharge chute;

wherein in the home position, the deflector blocks airflow into the first discharge chute and blocks airflow into the second discharge chute; and wherein the deflector passes through the home position as it transitions between the first position and the second position.

6. The ride-on blower of claim 1, wherein rotation of the deflector to the first position and rotation of the deflector to the second position are each opposed by a damper coupled to the chassis, the damper being configured to reduce a rotational velocity of the deflector.

7. The ride-on blower of claim 1, wherein the deflector is defined by a first blocking plate, a second blocking plate, and a convex inlet plate, wherein the first blocking plate and the second blocking plate extend away and diverge from a first end of the deflector, wherein the convex inlet plate extends between the first blocking plate and the second blocking plate to define a second end of the deflector, and wherein the first end of the deflector is coupled to a deflector shaft that rotates in response to movement by the actuator.

8. The ride-on blower of claim 1, wherein the first discharge chute is defined by a first length and the second discharge chute is defined by a second length, wherein the first length is greater than the second length.

9. The ride-on blower of claim 1, wherein the actuator is a foot pedal, and wherein the foot pedal is positioned above an operator platform that extends rearwardly away from the chassis.

10. The ride-on blower of claim 1, wherein the actuator is a lever, and wherein the lever extends upwardly away from the chassis to a control panel of the ride-on blower.

11. A stand-on blower comprising:
a chassis;
a prime mover supported by the chassis and operably coupled to an impeller, wherein the prime mover is configured rotate the impeller;
a blower housing receiving the impeller, the blower housing defining an air inlet to pull external air into the blower housing to the impeller;
a discharge housing coupled to the blower housing, the discharge housing including a first discharge chute having a first chute exit and a second discharge chute having a second chute exit with the first chute exit positioned to discharge air flow generated by the impeller to a first side of the chassis and the second chute exit positioned to discharge air flow generated by the impeller to a second side of the chassis; and
a deflector assembly comprising:
an actuator movable among at least two positions; and
a deflector mechanically coupled to the actuator through a geared connection such that movement of the actuator rotates the deflector within the discharge housing;
wherein rotation of the actuator in a first direction to a first stop rotates the deflector to a first position directing air flow generated by the impeller through the first discharge chute and blocking air flow generated by the impeller through the second discharge chute;
wherein rotation of the actuator in a second direction opposite the first direction to a second stop rotates the deflector to a second position directing air flow generated by the impeller through the second discharge chute and blocking air flow generated by the impeller through the first discharge chute,
wherein the actuator is a pedal;
wherein the pedal is coupled to a pedal shaft that supports a first gear;
wherein the deflector is coupled to a deflector shaft that supports a second gear, and
wherein the first gear and the second gear are meshed so that rotation of the pedal rotates the pedal shaft and first gear in the first direction, which rotates the second gear, deflector shaft, and deflector in the second direction.

12. The stand-on blower of claim 11, wherein the geared connection between the actuator and the deflector is arranged so that rotation of the actuator over a first angle rotates the deflector over a second angle that is at least twice as large as the first angle.

13. The stand-on blower of claim 11, wherein the first gear is a fan-shaped gear and the second gear is a spur gear.

14. The stand-on blower of claim 11, wherein a damper is operatively coupled to the deflector shaft at a first end and coupled to the chassis at a second end, wherein the damper is configured to oppose rapid rotation of the deflector to the first position or the second position.

15. A deflector assembly for controlling forced airflow through a discharge housing, the deflector assembly comprising:
an actuator manually movable in at least a first direction and a second direction opposite the first direction;
an actuator shaft coupled to the actuator on a proximate end, the actuator shaft being movable in response to movement by the actuator;
a first gear rigidly coupled to a distal end of the actuator shaft opposite the proximate end, the first gear rotating in response to movement by the actuator shaft;
a second gear meshed with the first gear such that rotation of the first gear in the first direction rotates the second gear in the second direction;
a deflector shaft rigidly coupled to the second gear so that rotation of the second gear rotates the deflector shaft; and
a deflector coupled to the deflector shaft and configured to rotate with the deflector shaft; and
wherein the deflector is movable over a first sweep range of between 130 degrees and 160 degrees in response to movement of the actuator over a second sweep range of between 50 degrees and 70 degrees.

16. The deflector assembly of claim 15, wherein a damper is operatively coupled to the deflector shaft to oppose rapid rotation of the deflector.

* * * * *